W. E. CANE.
BALL BEARING.
APPLICATION FILED NOV. 9, 1908.
939,391.
Patented Nov. 9, 1909.
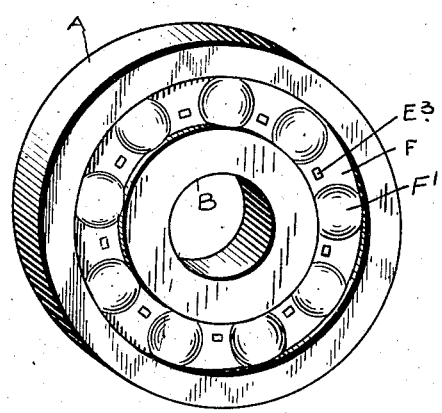
FIG. 1.
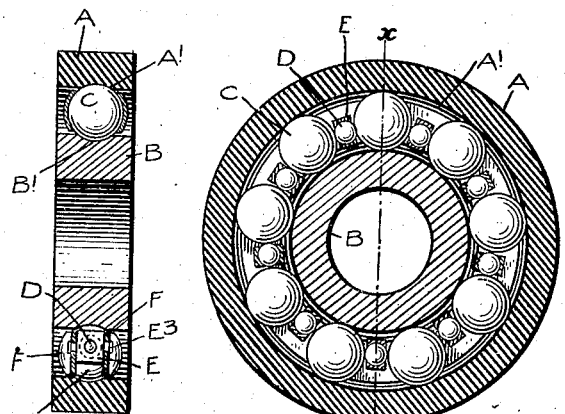
FIG. 3.   FIG. 2.
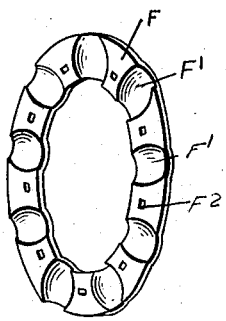
FIG. 5.
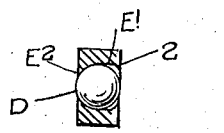
FIG. 7.   FIG. 4.
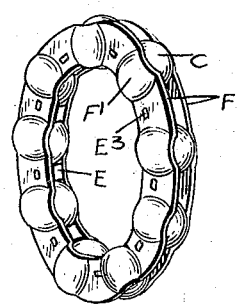
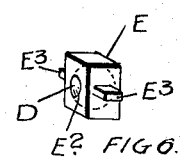
FIG. 6.
WITNESSES.
INVENTOR.
W. E. CANE.

UNITED STATES PATENT OFFICE.

UNITED STATES PATENT OFFICE.

WILLIAM ETHELBERT CANE, OF TORONTO, ONTARIO, CANADA, ASSIGNOR TO WILLIAM JOHN MURRAY, OF TORONTO, CANADA.

BALL-BEARING.

939,391.

Specification of Letters Patent.  Patented Nov. 9, 1909.

Application filed November 9, 1908. Serial No. 461,773.

*To all whom it may concern:*

Be it known that I, WILLIAM ETHELBERT CANE, of the city of Toronto, in the county of York, in the Province of Ontario, Canada, have invented certain new and useful Improvements in Ball-Bearings, of which the following is the specification.

My invention relates to improvements in double ball bearings in which the major balls rotate in oppositely located grooves in outer and inner rings or races, and the object of the invention is to devise a floating cage in which the friction and wear of the load carrying balls caused by their contact with portions of the cage will be reduced to a minimum.

A further object is to provide a simple means, whereby the minor balls may be readily assembled and retained in their proper relative position prior to and when placed in position in relation to the major balls in the bearing, so that both sides of the cage may be affixed in position to permanently retain both major and minor balls in place.

My invention consists of an outer and inner ring provided with opposing grooves with which the major balls contact in rotating, a floating cage having concavo-convex depressions in the inner face designed to fit the major balls at the sides for a minimum portion of their surface, so that the contact is well within the load carrying periphery of the balls or in other words at a maximum distance from the plane passing through the center of the load carrying periphery of the balls, blocks connecting the sides of the floating cage together and carrying the minor balls in a recess, so that the center of each minor ball is on a straight line connecting the centers of the two adjacent major balls, the blocks being provided with reduced outer ends or bosses and riveted in the floating rings as hereinafter more particularly explained.

Figure 1, is a perspective view showing my improved double ball bearing. Fig. 2, is a vertical section through the center of the bearing at right angles to the axis of rotation. Fig. 3, is a section through the bearing on the plane passing through the axis of rotation viz. line $x$—$y$ shown in Fig. 2. Fig. 4, is a detail of the cage and balls complete. Fig. 5, is a detail of one side of the cage. Fig. 6, is a detail of the block in which the minor ball is held, and Fig. 7, is a sectional detail of the block showing the location of the minor ball therein.

In the drawings like letters of reference indicate corresponding parts in each figure.

A is the outer ring of the bearing having an internal annular groove A′ arc-shaped in form to correspond to the arc of the ball, which runs in the same.

B is the inner ring, which is provided with an arc-shaped annular groove B′ corresponding to the arc of the ball, which runs therein.

C are the major balls, which are located at equal distances apart and run in the grooves A′ and B′.

D are the minor balls, which are fitted into the recesses E′ in the block E. The recess E′ has a hole E² to which the ball D extends, although it does not project beyond the plane of the side of the block. The opposite side of the hole E′ is larger and is staked or turned inwardly at 2, so as to retain the ball in place in the block preparatory to assembling. The surface of the ball at the larger end of the hole or recess E′ is substantially flush with the plane of this side or face of the block.

It is not necessary to have the minor ball D project through the block as the arc of the major ball will contact tangentially with the arc of the minor ball, although the contour of the minor ball does not project through the block, as will be readily understood.

The ends of the block E are provided with reduced projections E³ as indicated.

F are the annular sides of the floating cage, which are provided with a series of concavo-convex recesses F′, the depths of which are made as little as possible, so as to produce arcs bearing or contacting with the balls of as small an arc as possible to give sufficient bearing to hold the balls in place in their rotation and bring the contact at a maximum distance from the plane passing through the load carrying peripheral plane of the ball, thereby reducing friction and wear to a minimum. Such friction contact is at the slowest possible rotation point of the ball, that is where the point on the ball where the surface is rotating at the slowest speed or comparatively so to the maximum periphery of the ball carrying the load. Two such rings F are provided.

The blocks E have their projecting ends

E³ at one side fitted into recesses in the jig in the usual manner to determine the relative position of the balls and then the major balls are placed in position between the minor balls and the face ring at the opposite side is placed in position with the openings F² placed over the projecting ends E³ of the block E' at this side. The projecting ends E³ are riveted in position and then the jig at the opposite side removed and the projecting ends E³ then passed through the holes F² of the ring F at the opposite side and suitably riveted in position. The major balls, of course, are sprung into position in the grooves A' and B' in the races or rings A and B.

It will be noticed that each block E, is placed so that the center of the minor ball held therein, is held on a line passing through the two centers of the major balls adjacent thereto.

Such a bearing as I describe can be made very cheaply and as the contact of the sides of the major balls with the floating rings forming the sides of the cage is at a maximum distance from the plane passing through the load carrying peripheral circle of the major balls the frictional contact is at the slowest possible points of rotation of the major balls within the concave recesses and as a consequence the friction and wear is reduced to a minimum.

What I claim as my invention is:

1. In a double-ball bearing, the combination with an outer ring having an internal annular groove and an inner ring having an external annular groove, of the minor and major balls and a floating cage comprising the sides having concave recesses held against the major balls where the surface speed of the balls is the slowest, blocks adapted to hold the contacting points of the minor balls adjacent to the contacting points of the major balls and extending between the sides of the cage and having rectangular projecting ends so held and fastened in the side rings of the cage, so as to hold the rings together and each minor ball and its contacting point with the major balls on a line passing through the center thereof and of the major balls adjacent thereto as and for the purpose specified.

2. In a double-ball bearing, the combination with an outer ring having an internal annular groove and an inner ring having an external annular groove, of the minor and major balls and a floating cage comprising the sides having concave recesses held against the major balls at the slowest points of rotation at each side, blocks provided with recesses having one end semicircular and provided with a hole and the opposite end enlarged and staked and having rectangular projecting ends so riveted in the side rings of the cage, so as to hold the rings together and each minor ball on a line passing through the center thereof and of the major balls adjacent thereto as and for the purpose specified.

3. In a double-ball bearing and cage therefor, a rectangular block formed with a recess in which the minor ball is adapted to fit, such recess having a minor opening at one end and a major opening at the opposite end through which the ball is placed in position in the block, the edge of the larger opening being staked to retain the ball in position preparatory to assembling as specified.

WILLIAM ETHELBERT CANE.

Witnesses:
B. BOYD,
R. COBAIN.